US012612170B2

(12) United States Patent
Pautis et al.

(10) Patent No.: US 12,612,170 B2
(45) Date of Patent: Apr. 28, 2026

(54) FORWARD ENGINE MOUNT WITH CONVERGING LINKS

(71) Applicant: Airbus Operations SAS, Toulouse (FR)

(72) Inventors: Olivier Pautis, Toulouse (FR);
Germain Gueneau, Toulouse (FR);
Jerome Colmagro, Toulouse (FR);
Fabrice Grimal, Toulouse (FR);
Frederic Journade, Toulouse (FR);
Marc De Nicola, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/039,410

(22) Filed: Jan. 28, 2025

(65) Prior Publication Data

US 2025/0242934 A1 Jul. 31, 2025

Related U.S. Application Data

(60) Provisional application No. 63/626,146, filed on Jan. 29, 2024.

(51) Int. Cl.
*B64D 27/40* (2024.01)

(52) U.S. Cl.
CPC ................................. *B64D 27/402* (2024.01)

(58) Field of Classification Search
CPC ............................ B64D 27/406; B64D 27/404
See application file for complete search history.

(56) References Cited

U.S. PATENT DOCUMENTS

| | | | | |
|---|---|---|---|---|
| 5,452,575 | A | * 9/1995 | Freid | B64D 27/406 |
| | | | | 244/54 |
| 8,672,260 | B2 | * 3/2014 | Penda | B64D 27/406 |
| | | | | 244/54 |
| 10,723,471 | B2 | * 7/2020 | Stuart | B64D 27/404 |
| 11,345,480 | B2 | * 5/2022 | Mertes | B64D 27/404 |
| 12,129,767 | B1 | * 10/2024 | Sage | F01D 25/28 |
| 2017/0259929 | A1 | * 9/2017 | Stuart | B64D 27/406 |

FOREIGN PATENT DOCUMENTS

FR              2925016 A1 * 6/2009 ........... B64D 27/406

* cited by examiner

*Primary Examiner* — Richard Green
(74) *Attorney, Agent, or Firm* — Greer Burns & Crain Ltd.

(57) ABSTRACT

An engine mounting assembly comprising a forward engine mount coupled to a pylon of the aircraft and an engine, the engine having a propeller with a center of thrust, the forward engine mount having a longitudinal axis that intersects with the center of thrust, an intermediate engine mount including at least two thrust links coupled to the pylon and the engine aft of the forward engine mount, the intermediate engine mount having a longitudinal axis that intersects with the center of thrust, wherein the longitudinal axis of the forward engine mount and the longitudinal axis of the intermediate engine mount intersect at the center of thrust, and a rear engine mount coupled to the pylon and the engine aft of the intermediate engine mount.

13 Claims, 6 Drawing Sheets

FORWARD ENGINE MOUNT WITH CONVERGING LINKS

CROSS-REFERENCES TO RELATED APPLICATIONS

This application claims the benefit of the U.S. provisional patent application No. 63/626,146 filed on Jan. 29, 2024, the entire disclosure of which is incorporated herein by way of reference.

FIELD OF THE INVENTION

The invention relates to an engine for an aircraft, and more particularly to an engine mount for connecting the engine to a pylon or mast.

BACKGROUND OF THE INVENTION

The quest for performance on aircraft is leading to an increase in the diameter of engines without increasing the size of the landing gear and/or the height of the wing. In addition, these larger engines mean that increasingly high loads have to be transmitted to the wing, via the attachment system that forms the engine pylon/wing interface. This attachment system is generally isostatic and consists of a set of shackles/pins/rotary fittings, etc.

In addition, as the delta between the large diameter of the fan and the core becomes ever greater, the core area of the engine becomes increasingly exposed to overload induced by the greater forces generated by the rotating element of the fan.

With these larger engines, it is important to optimize the stacking of the various components contained in the vertical plane passing through the engine axis and limited in the lower zone by the ground and in the upper zone by the front face of the wing. This is referred to as the vertical dimension chain of the stack contained in this plane.

The space dedicated to a mast structure generally positioned at "12 o'clock" between the wing and the engine is a result, and is increasingly restricted, it is becoming difficult to define a structure that is high enough to have the rigidity required for correct installation and a fastening system that is robust enough to withstand the larger loads.

Depending on the design/disposition of the attachment system, certain forces pass through the casings of the turbomachine and particularly through the so-called "core" zone, which is responsible for its compression performance. This stress under load can, in some cases, degrade the overall performance of the engine and ultimately its specific fuel consumption.

In conventional engine mounting systems connecting an engine to a pylon, the front engine mounts and thrust rods converge at the engine center of gravity. With larger engines producing larger loads, this arrangement can cause undesired stresses on the conventional engine mounting systems and cause the engine to dip or move closer to the ground under load which could cause an engine ground strike.

SUMMARY OF THE INVENTION

An object of the present engine mounting system is to provide such a system where the front engine mounts and thrust rods converge at the propeller/fan loads application point or center of thrust. This distributes/routes propeller/fan loads directly in the pylon structure, at the front of the pylon area and minimizing loads going through of the engine core casing, then avoiding bending and risk on core tip closure, in addition to reducing losses in specific fuel consumption (SFC).

To that end, there is a proposed engine mounting system for an aircraft, the engine mounting system comprising:

a forward engine mount coupled to a pylon of the aircraft and an engine, the engine having a propeller with a center of thrust, the forward engine mount having a longitudinal axis that intersects with the center of thrust;

an intermediate engine mount including at least two thrust links coupled to the pylon and the engine aft of the forward engine mount, the intermediate engine mount having a longitudinal axis that intersects with the center of thrust, wherein the longitudinal axis of the forward engine mount and the longitudinal axis of the intermediate engine mount intersect at the center of thrust; and a rear engine mount coupled to the pylon and the engine aft of the intermediate engine mount.

According to a particular embodiment, the forward engine mount further includes at least two two-point shackles coupled to a frontal wall of the pylon.

According to a particular embodiment, an orientation of the at least two two-point shackles is adjustable to modify a load distribution through the pylon.

According to a particular embodiment, the at least two two-point shackles are arranged to direct the load distribution through a center point of the pylon.

According to a particular embodiment, the at least two two-point shackles are arranged to direct the load distribution through an upper-most point of the engine.

According to a particular embodiment, the at least two two-point shackles are arranged to direct the load distribution through an intermediate point of the engine in between an upper-most point of the engine and a centerline of the engine.

According to a particular embodiment, the at least two two-point shackles are arranged to direct the load distribution through a centerline of the engine.

According to a particular embodiment, the at least two thrust links of the intermediate engine mount are coupled to the pylon via an intermediate fastener, the intermediate fastener coupled to an underside wall of the pylon.

According to a particular embodiment, the rear engine mount further includes a two-point shackle and a three-point shackle oriented on opposite sides of a centerline of the engine and coupled to an underside wall of the pylon aft of the intermediate engine mount.

According to a particular embodiment, the engine mounting system is configured to provide a six degrees-of-freedom pylon interface, two degrees-of-freedom attributable to the forward engine mount in Y-Z directions, one degree-of-freedom attributable to the at least two thrust links in an X direction, and three degrees-of-freedom attributable to the rear engine mount in Mx-My-Mz directions.

The invention also proposes propulsion assembly for an aircraft, the propulsion assembly comprising:

a jet engine having a casing having, from the front to the rear, an intermediate casing and a core casing about a longitudinal axis and having a vertical median plane passing through the longitudinal axis, wherein the core casing extends to the rear of the intermediate casing and has a smaller diameter than the intermediate casing, the jet engine, at the intermediate casing, having a high-bypass fan with a center of thrust;

an attachment pylon having a rigid structure with a frontal wall and an underside wall; and the engine mounting system according to one of the preceding variants, wherein the forward engine mount is fastened to the frontal wall of the attachment pylon such that the longitudinal axis of the forward engine mount intersects with the center of thrust of the high-bypass fan, wherein the at least two thrust links are symmetrically disposed on either side of the median plane and fastened to the underside wall of the attachment pylon such that the longitudinal axis of the intermediate engine mount intersects with the longitudinal axis of the forward engine mount at the center of thrust of the high-bypass fan, and wherein the rear engine mount is fastened to the underside wall of the attachment pylon aft of the at least two thrust links.

The invention also proposes an aircraft comprising a fuselage, a wing attached to the fuselage, and the propulsion assembly according to one of the preceding variants attached to an underside of the wing via the rigid structure.

DETAILED DESCRIPTION OF THE DRAWINGS

Embodiments of the invention are described in more detail with reference to the accompanying schematic drawings that are listed below.

In general, the same reference numbers will be used throughout the drawing(s) and accompanying written description to refer to the same or like parts.

DETAILED DESCRIPTION OF THE PREFERRED EMBODIMENTS

Figure 1:
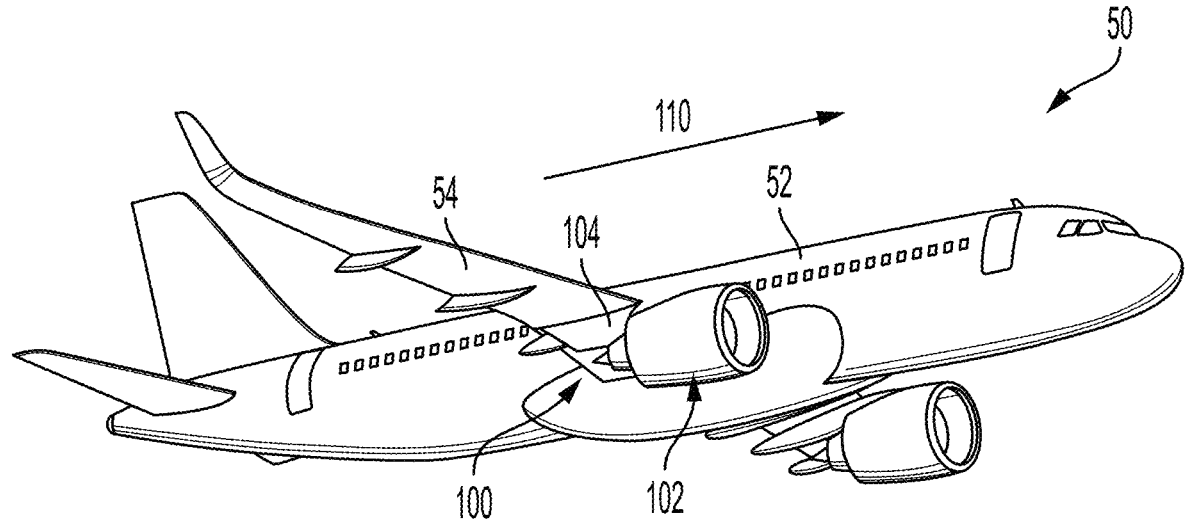
FIG. 1 shows a perspective view of an aircraft according to the present invention.

FIG. 1 shows an aircraft 50 that has a fuselage 52 and a wing 54 attached to the fuselage beneath which a propulsion assembly 100 according to the invention is mounted that has a jet engine 102, in this case housed in a nacelle, and an attachment pylon 104.

By convention, X denotes a longitudinal axis of the jet engine 102, this axis X being parallel to a longitudinal direction of this jet engine 102. X also denotes a centerline of the jet engine 102. Moreover, Y denotes a transverse axis of the jet engine 102, this axis being horizontal when the aircraft is on the ground, and Z denotes a vertical axis or vertical height when the aircraft is on the ground, these three axes X, Y and Z being mutually orthogonal (shown in FIGS. 3 and 4).

Moreover, the terms "front" and "rear" are to be considered relative to a direction of forward movement of the aircraft 50 when the jet engine 102 is in operation, this direction being schematically shown by the arrow 110.

The attachment pylon 104 is roughly symmetrical with respect to a vertical median plane XZ of the jet engine 102, the plane passing through the longitudinal axis X of the jet engine 102 and being referred to hereinafter as median plane.

Figure 2:
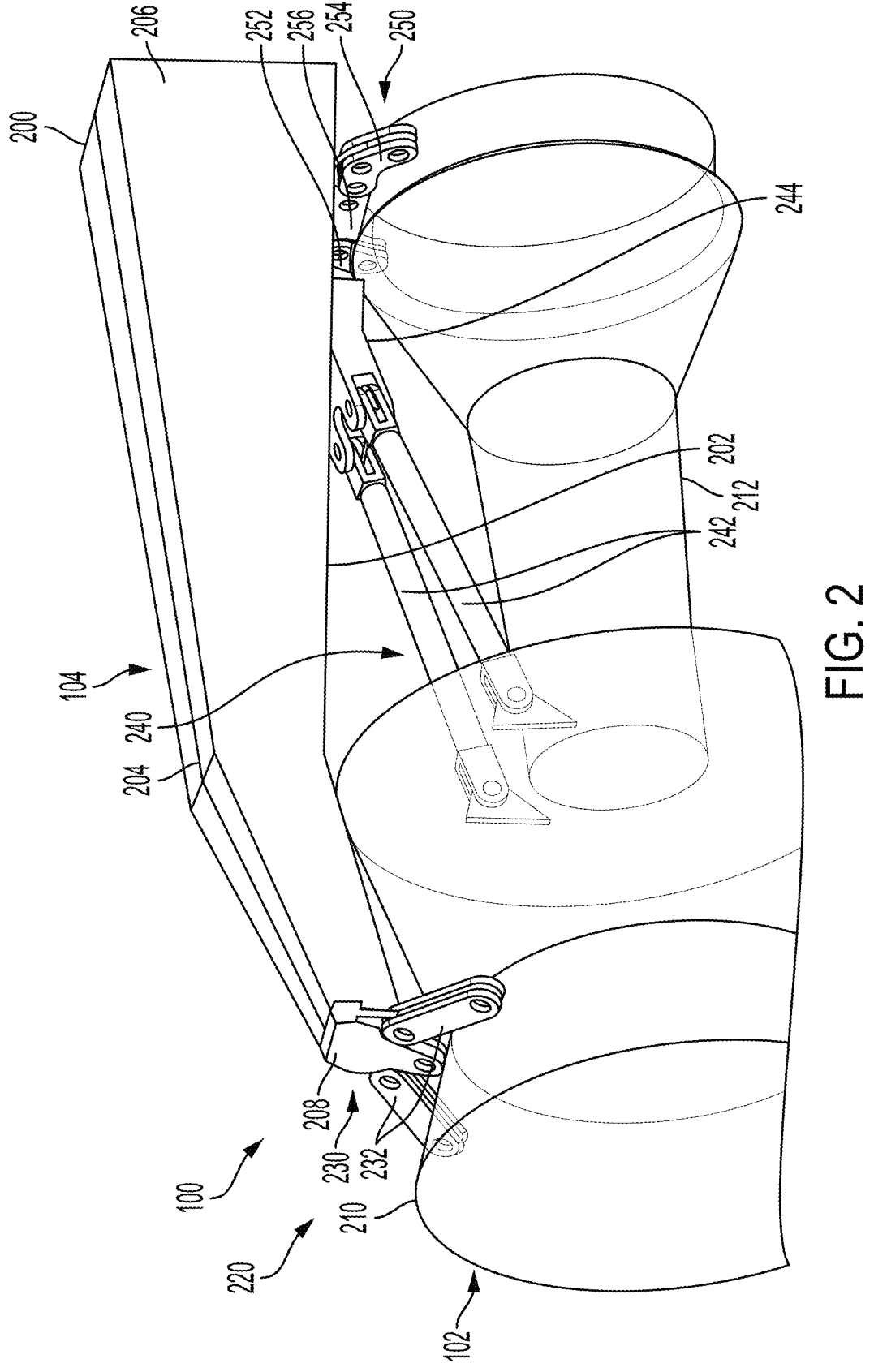
FIG. 2 shows a propulsion assembly of the present invention.

FIG. 2 shows the propulsion assembly 100 that has the jet engine 102 and the attachment pylon 104 via which the jet engine 102 is fastened to the wing 54 (not shown in FIG. 2). The attachment pylon 104 is shown here by a rigid structure 200, which is also referred to as the primary structure. The rigid structure 200 extends along the longitudinal axis X between a front end and a rear end, between which there is a median zone.

In the example of FIG. 2, the rigid structure 200 takes the form of a polyhedron (or other shape of the like) that has a lower wall 202, an upper wall 204, two lateral walls 206 on either side of the median plane and a frontal wall 208 oriented towards the front. The rigid structure 200 is fastened to the wing 54 via means known to those skilled in the art.

In the example of FIG. 2, the jet engine 102 has, from the front to the rear, a fan casing 210 in which a fan embodying a rotor is mounted and a core casing 212 in which compression stages, a combustion chamber, turbine stages and an exhaust nozzle are successively housed (e.g., a core of the jet engine 102). In some examples, the fan encased by the fan casing 210 is one of a high bypass fan or a low bypass fan. The flow of air which enters through the fan casing 210 is divided into a primary flow which flows into the core and a bypass flow which flows around the core.

The core casing 212 extends to a rear of the fan casing 210 and has a smaller diameter than the fan casing 210, thus allowing for structural components to be placed and/or mounted to the fan casing 210 without interfering with operation of the core of the jet engine 102.

In the example of FIG. 2, the propulsion assembly 100 includes an engine mounting system 220 for coupling the jet engine 102 to the rigid structure 200 of the attachment pylon 104. The engine mounting system 220 includes a forward engine mount 230, an intermediate engine mount 240, and a rear engine mount 250. As shown in FIG. 2, the intermediate engine mount 240 is disposed between the forward engine mount 230 and the rear engine mount 250.

The forward engine mount 230 of the example of FIG. 2 includes front shackles 232 that couple the fan casing 210 to the frontal wall 208 of the rigid structure 200. In the example of FIG. 2, the front shackles 232 are two-point shackles. However, other variations can be used according to the examples disclosed herein such as three-point shackles, etc.

In some examples, redundancy is desired to prevent undesired consequences due to failure of components within the engine mounting system 220. As such, as shown in the example of FIG. 2, two front shackles 232 are used on either side of centerline of the jet engine 102. Including two sets of front shackles 232 allows for greater redundancy protection in the event that any of the front shackles 232 were to fail during operation of the jet engine 102.

In the example of FIG. 2, the intermediate engine mount 240 includes at least two thrust links 242. The thrust links 242 couple the rear of the fan casing 210 to the lower wall 202 of the rigid structure 200. The thrust links 242 are coupled to the lower wall 202 via an intermediate fastener 244. In some examples, the intermediate fastener 244 is a thrust link rudder arranged to orient the thrust link 242 in a desired configuration (e.g., aligning connectors of the thrust links 242 appropriately).

The rear engine mount 250 includes a first rear shackle 252 and a second rear shackle 254. In the example of FIG. 2, the first rear shackle 252 is a two-point shackle and the second rear shackle 254 is a three-point shackle. In such an example, the first rear shackle 252 and the second rear shackle 254 being of different types of shackles allows for a greater range of motion of the rear engine mount 250 (e.g., freedom of motion in more than one axis). Similar to that of the forward engine mount 230, the rear engine mount 250 can include, in some examples, a pair of first rear shackles 252 and a pair of second rear shackles 254 to provide redundancy in the event of failure.

As shown in FIG. 2, the rear engine mount 250 is coupled to the rigid structure 200 via a rear fastener 256. The rear fastener 256 is disposed on the lower wall 202 of the rigid structure 200 (also explained in reference to FIG. 6).

Figure 3:
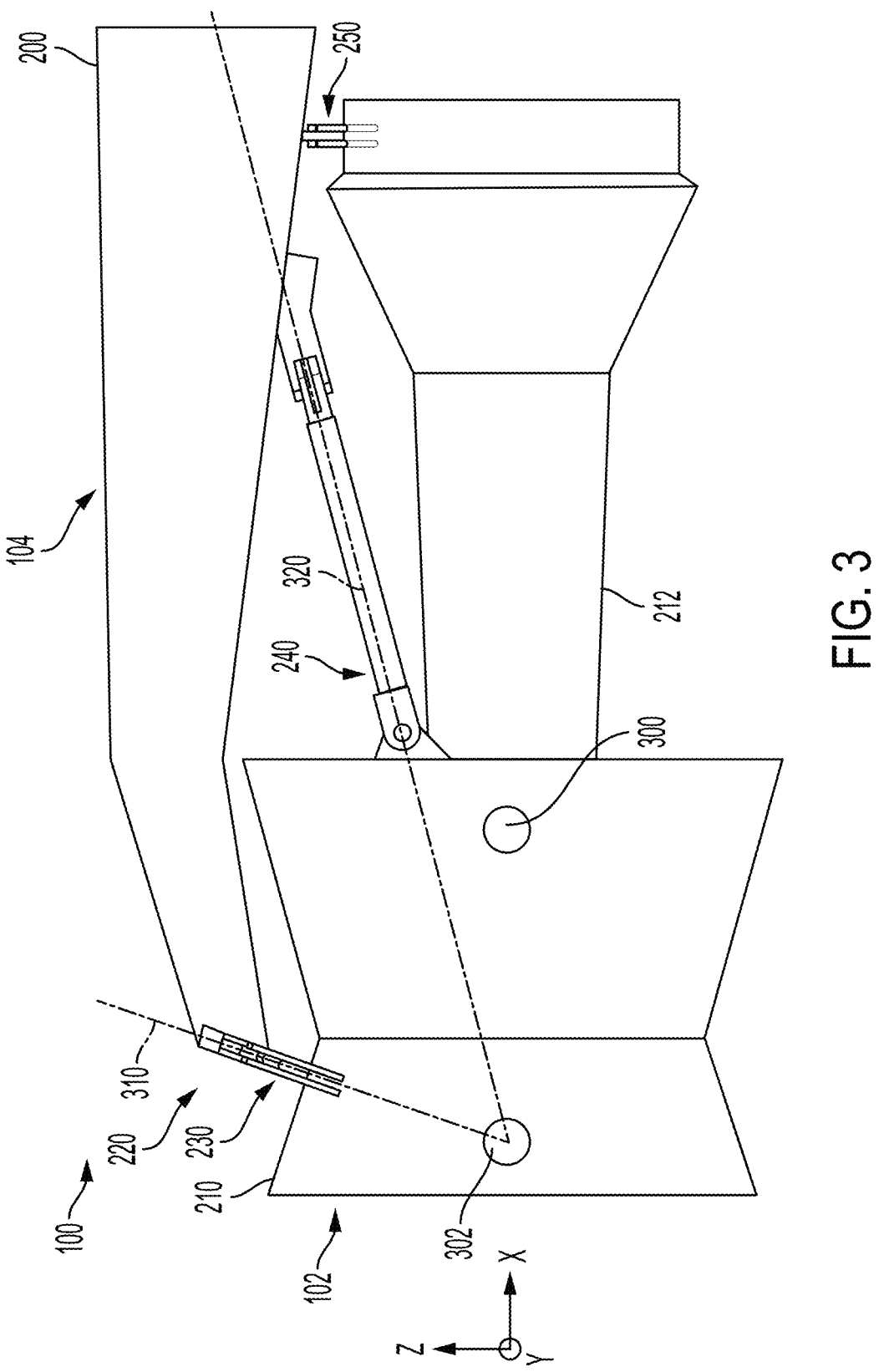
FIG. 3 shows a side view of the propulsion assembly of FIG. 2.

FIG. 3 shows a side view of the propulsion assembly 100 of FIG. 2. A center of gravity (CoG) 300 of the jet engine 102 is a theoretical point of the jet engine 102 in which all of the weight of the jet engine 102 acts along the vertical Z axis in a negative direction. The fan of the jet engine 102, during operation, has a center of thrust 302 which acts along the longitudinal X axis. Conventional propulsion assemblies orient the engine mounting system 220 to such that loads applied during operation of the jet engine 102 are directed from the CoG 300 into the rigid structure 200 of the attachment pylon 104.

In conventional propulsion assemblies, as discussed above, increasing engine size and thrust is desirable without modifying the underlying structure of the aircraft (e.g., landing gear, wing positioning, etc.). Larger engines that produce greater thrust increase the possibility of clearance issues with the ground in conventional propulsion assemblies since, with loads directed through the aircraft CoG, increased torsional moments are placed on the existing systems such that greater displacement of the jet engine is likely to occur during operation. These increases in displacement can cause ground strikes of the jet engine since the existing systems are not designed to handle such torsional moments.

According to the example of FIG. 3, a new arrangement of the engine mounting system 220 is presented such that some of the loads applied during operation of the jet engine 102 are directed from the center of thrust 302 into the rigid structure 200 of the attachment pylon 104. In such an orientation, displacement due to torsional moments of the jet engine 102 during operation are reduced, thus allowing the jet engine 102 to be larger in size and thrust capabilities while maintaining appropriate ground clearance during operation.

As shown in the example of FIG. 3, the forward engine mount 230 has a longitudinal axis 310 extending along a plane in which the forward engine mount 230 lies and intersects at the center of thrust 302 of the jet engine 102. Likewise, the intermediate engine mount 240 has a longitudinal axis 320 extending along a plane in which the intermediate engine mount 240 lies and also intersects at the center of thrust 302. In such an orientation, the longitudinal axis 310 of the forward engine mount 230 and the longitudinal axis 320 of the intermediate engine mount 240 intersect at the center of thrust 302 of the jet engine 102.

In the example of FIG. 3, the loads created by the jet engine 102 are directed from the center of thrust 302 into the rigid structure 200 via the forward engine mount 230 and also via the intermediate engine mount 240. Since thrust loads created by the jet engine 102 are greater than a weight of the jet engine 102 (for example, 30,000 lbs. of thrust versus a weight of 8,000 lbs.), the greater of the loads attributable to the jet engine are directed into the rigid structure 200 of the attachment pylon 104, thus reducing displacement due to torsional moments.

Figure 4:
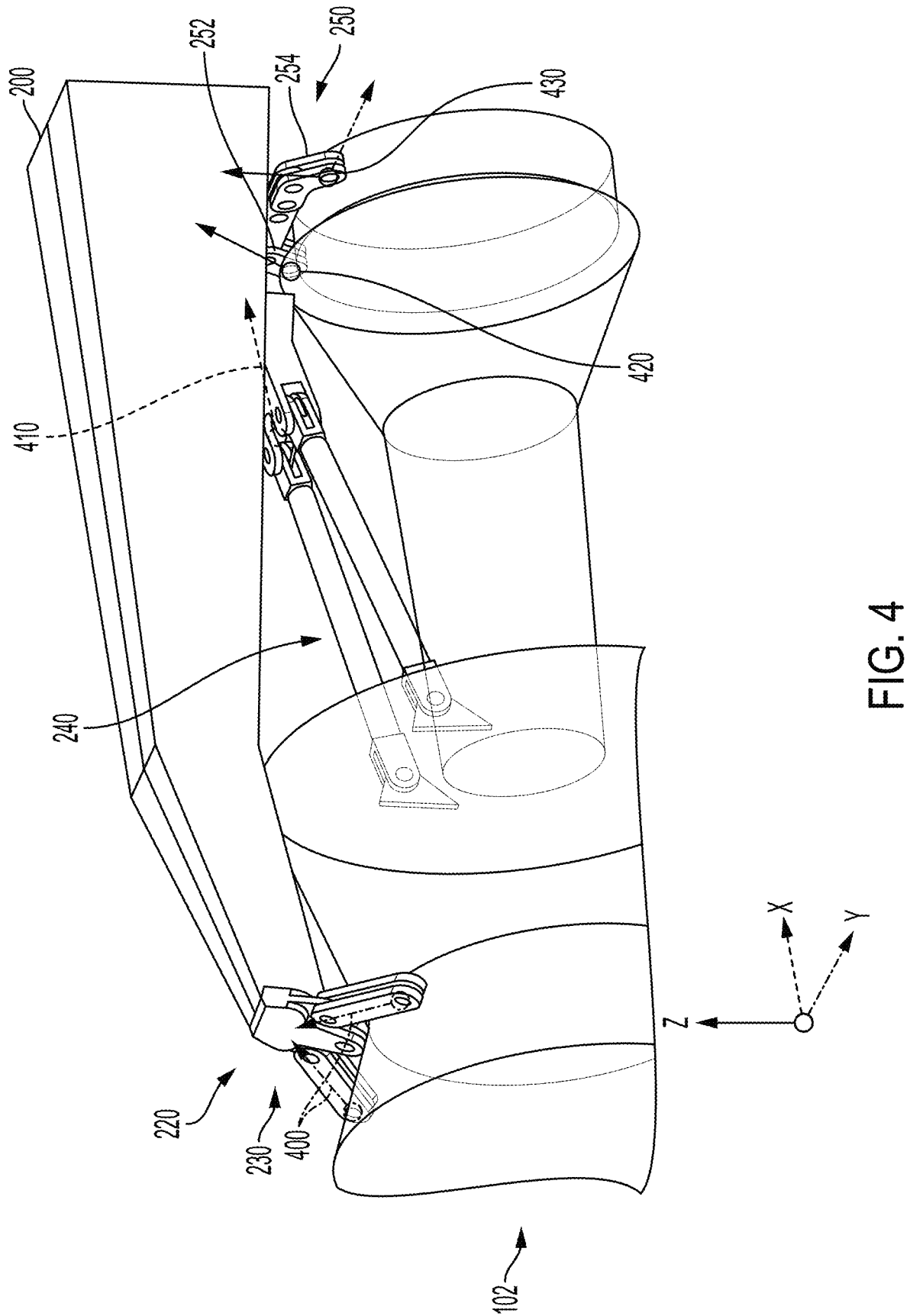
FIG. 4 shows a side and front view of a load distribution according to the propulsion assembly of FIGS. 2-3.

FIG. 4 shows a side and front view of a load distribution according to the propulsion assembly 100 of FIGS. 2-3. As shown in FIG. 4, the engine mounting system 220 is a statically determinate six degrees-of-freedom system including two degrees of freedom attributable to the forward engine mount 230, one degree of freedom attributable to the intermediate engine mount 240, and three degrees of freedom attributable to the rear engine mount 250.

The forward engine mount 230 distributes a first load distribution 400 in the transverse Y axis and the vertical Z axis. The intermediate engine mount 240 distributes a second load distribution 410 in the longitudinal X axis. The rear engine mount 250 distributes a third load distribution via the first rear shackle 252 in the vertical Z axis and a fourth load distribution via the second rear shackle 254 in the transverse Y axis and the vertical Z axis. Additionally, since the rear engine mount 250 is not arranged to direct the loads produced by the jet engine 102 from the center of thrust 302, the rear engine mount 250 also distributes Mx, My, and Mz moment loads created by the jet engine 102. Thus, the engine mounting system 220 includes six degrees-of-freedom, three translational degrees of freedom in the X, Y, and Z axes, and three rotational moment degrees of freedom in the Mx, My, and Mz moments.

Figure 5:
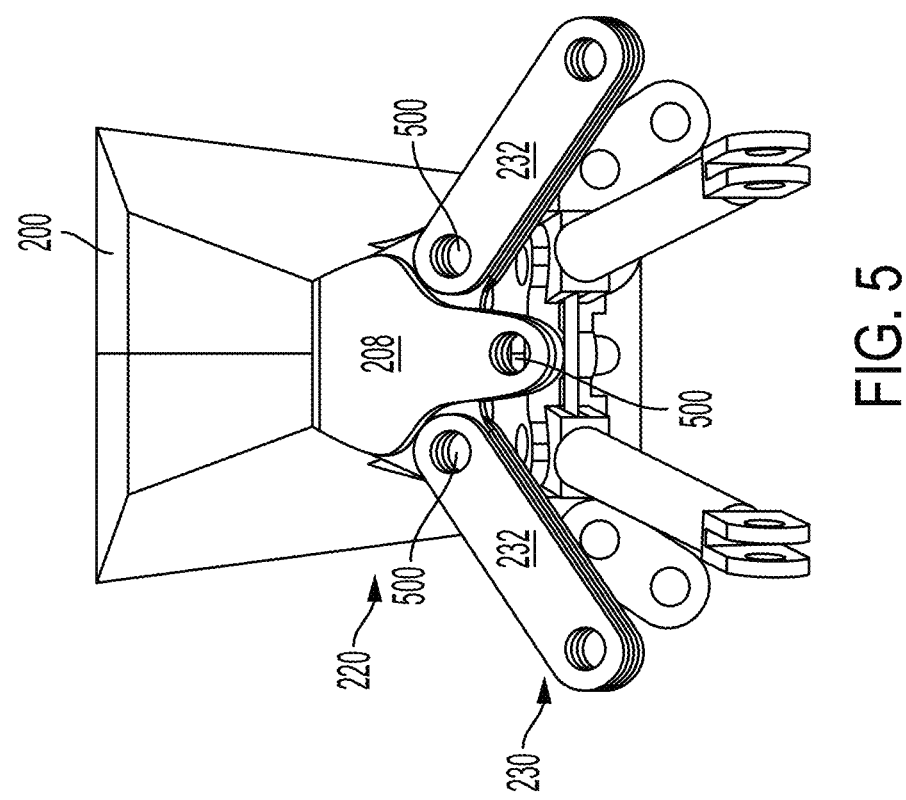
FIG. 5 is a front view of an engine mounting system according to FIGS. 2-3.

FIG. 5 is a front view of an engine mounting system 220 according to the propulsion assembly 100 of FIGS. 2-3. In the example of FIG. 5, the frontal wall 208 of the rigid structure 200 includes a first plurality of connection holes 500 for coupling the forward engine mount 230 to the rigid structure 200.

As shown in FIG. 5, the frontal wall 208 includes three connection holes, two connection holes arranged symmetrically about the longitudinal X axis, and a third connection hole arranged below the other two connection holes 500. As shown in FIG. 5, the third connection hole is unused, but the front shackles 232 can be arranged to utilize the third connection hole.

Figure 6:
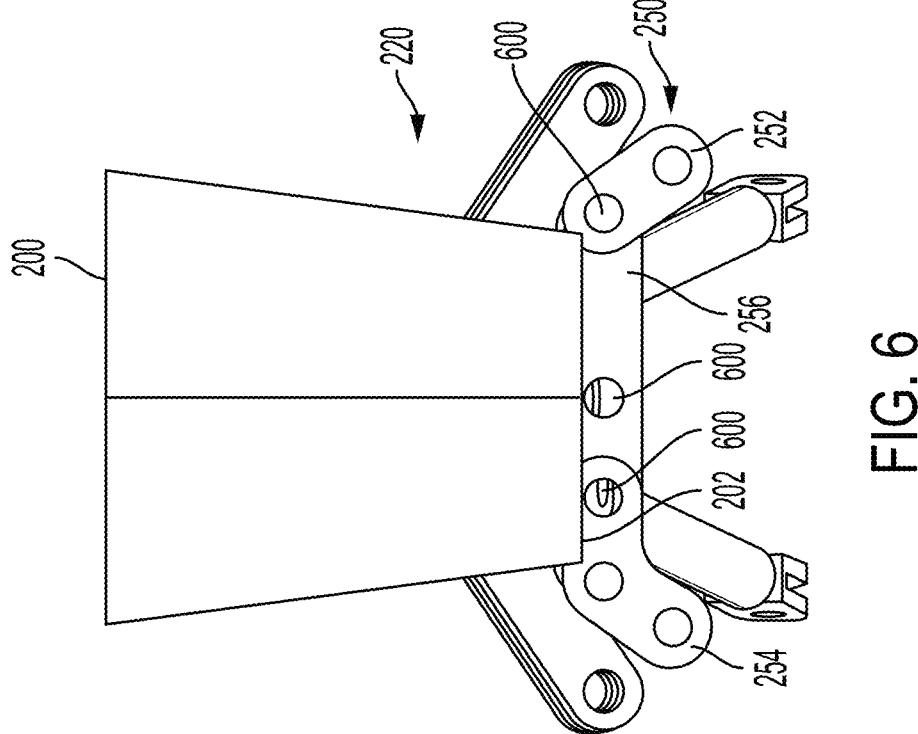
FIG. 6 is a rear view of the engine mounting system according to FIGS. 2-3.

FIG. 6 is a rear view of the engine mounting system 220 according to the propulsion assembly 100 of FIGS. 2-3. In the example of FIG. 6, the lower wall 202 of the rigid structure 200 includes the rear fastener 256. The rear fastener 256 includes a second plurality of connection holes 600 for coupling the rear engine mount 250 to the rigid structure 200.

As shown in FIG. 6, the rear fastener 256 includes three connection holes arranged in-line with each other across the lower wall 202 of the rigid structure 200. Two of the connection holes are favored toward the second shackle 254 of the rear engine mount 250, and the remaining connection hole is arranged for use by the first shackle 252. In the example of FIG. 6, the first shackle 252 is coupled to one of the outer connection holes. The second shackle 254 is coupled to the other of the outer connection holes, and the remaining connection hole is unused. However, in some examples, the second shackle 254 is coupled to the unused connection hole in addition to one of the outer connection holes.

Figure 7:
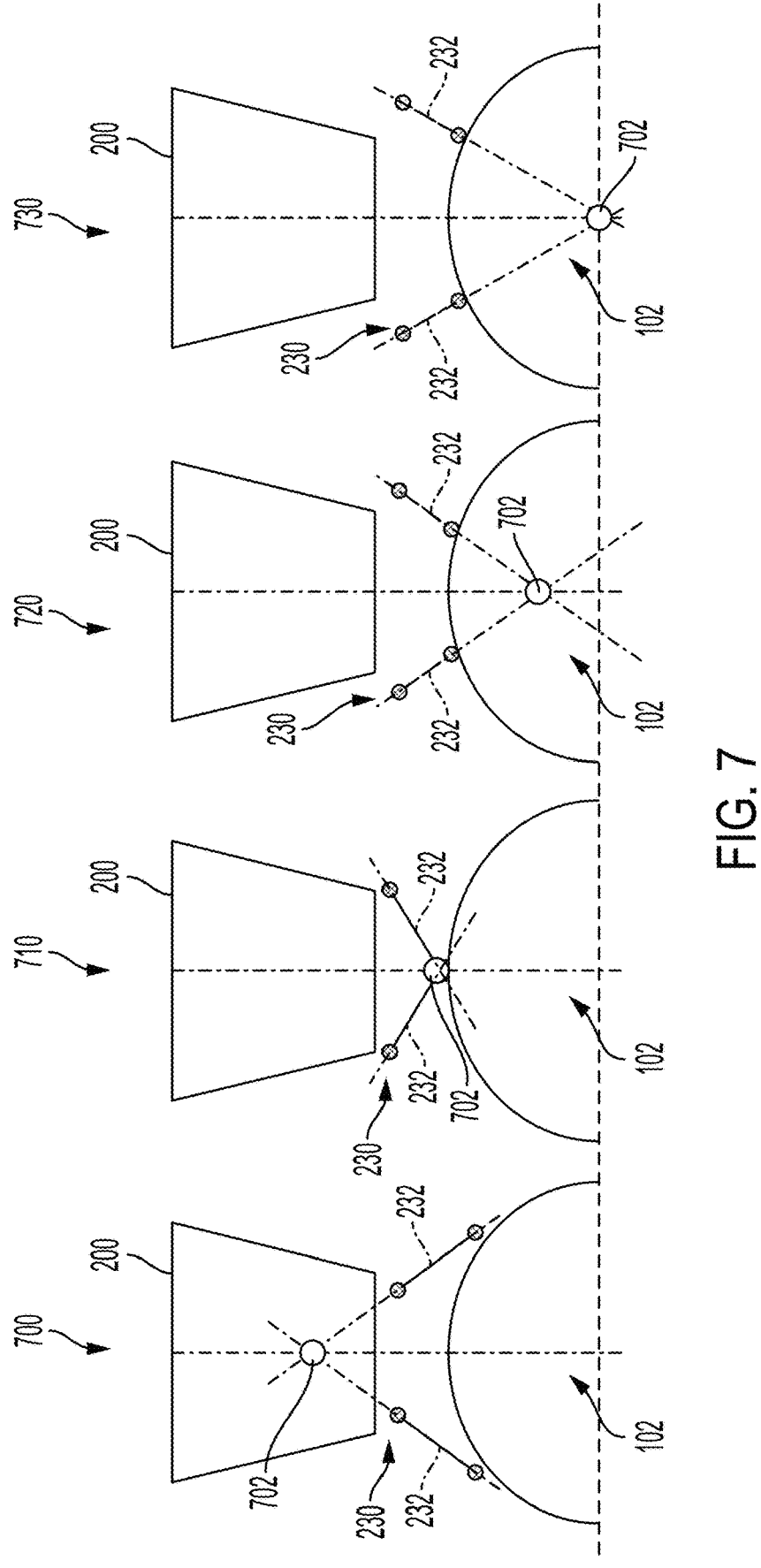
FIG. 7 shows a series of arrangements of a forward engine mount according to FIGS. 2-3 to adjust a load distribution point.

FIG. 7 shows a series of arrangements of the forward engine mount 230 to adjust a load distribution point 702. As shown in FIG. 7, a first orientation 700 of the forward engine mount 230 focuses the load distribution point 702 within the rigid structure 200 of the attachment pylon 104 by arranging the front shackles 232 according to the examples disclosed in FIGS. 2-6. According to the first orientation 700, the load distribution point 702 being focused within the rigid structure 200 transfers the loads applied by the jet engine 102 to the rigid structure.

In some examples, a different orientation may be desirable based on existing clearance limitations or structural factors. As such, a second orientation 710 is desirable in some examples to focus the load distribution point 702 to a top structure point (e.g., an upper-most point) of the jet engine 102, beneath the rigid structure 200.

Alternatively, a third orientation 720 is desirable in some examples to focus the load distribution point 702 to an intermediate structure point of the jet engine 102, beneath the upper-most point and above the centerline of the jet engine 102.

In yet another example, a fourth orientation 730 is desirable in some examples to focus the load distribution point 702 to a center structure point of the jet engine 102, in-line with the centerline of the jet engine 102.

According to the examples of FIG. 7, the front shackles 232 are adjustable on the frontal wall 208 of the rigid structure 200 to provide the orientations 700, 710, 720, 730 described herein. Additionally, in some examples, the jet engine 102 includes multiple connecting structures enabling the front shackles 232 to be oriented according to the examples of FIG. 7 to adjust the load distribution point 702.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An engine mounting system for an aircraft, the engine mounting system comprising:
   a forward engine mount coupled to a pylon of the aircraft and an engine, the engine having a propeller with a center of thrust, the forward engine mount having a longitudinal axis that intersects with the center of thrust;
   an intermediate engine mount including at least two thrust links coupled to the pylon aft of the forward engine mount and coupled to the engine aft of the forward engine mount, the intermediate engine mount having a longitudinal axis that intersects with the center of thrust, wherein the longitudinal axis of the forward engine mount and the longitudinal axis of the intermediate engine mount intersect at the center of thrust; and
   a rear engine mount coupled to the pylon and the engine aft of the intermediate engine mount;
   wherein the forward engine mount, the intermediate engine mount, and the rear engine mount are separated from each other by at least a portion of the pylon in a longitudinal direction of the pylon.

2. The engine mounting system of claim 1, wherein the forward engine mount further includes at least two two-point shackles coupled to a frontal wall of the pylon.

3. The engine mounting system of claim 2, wherein an orientation of the at least two two-point shackles in relation to the pylon and the engine is adjustable to modify a load distribution through the pylon.

4. The engine mounting system of claim 3, wherein the at least two two-point shackles are arranged to direct the load distribution through a center point of the pylon.

5. The engine mounting system of claim 3, wherein the at least two two-point shackles are arranged to direct the load distribution through an upper-most point of the engine.

6. The engine mounting system of claim 3, wherein the at least two two-point shackles are arranged to direct the load distribution through an intermediate point of the engine in between an upper-most point of the engine and a centerline of the engine.

7. The engine mounting system of claim 3, wherein the at least two two-point shackles are arranged to direct the load distribution through a centerline of the engine.

8. The engine mounting system of claim 1, wherein the at least two thrust links of the intermediate engine mount are coupled to the pylon via an intermediate fastener, the intermediate fastener coupled to an underside wall of the pylon.

9. The engine mounting system of claim 1, wherein the rear engine mount further includes a two-point shackle and a three-point shackle oriented on opposite sides of a centerline of the engine and coupled to an underside wall of the pylon aft of the intermediate engine mount.

10. The engine mounting system of claim 1, wherein the engine mounting system is configured to provide a six degrees-of-freedom pylon interface, two degrees-of-freedom attributable to the forward engine mount in Y-Z directions, one degree-of-freedom attributable to the at least two thrust links in an X direction, and three degrees-of-freedom attributable to the rear engine mount in Mx-My-Mz directions.

11. A propulsion assembly for an aircraft, the propulsion assembly comprising:
   a jet engine having a casing having, from the front to the rear, an intermediate casing and a core casing about a longitudinal axis and having a vertical median plane passing through the longitudinal axis, wherein the core casing extends to the rear of the intermediate casing and has a smaller diameter than the intermediate casing, the jet engine, at the intermediate casing, having a high-bypass fan with a center of thrust;
   an attachment pylon having a rigid structure with a frontal wall and an underside wall; and
   the engine mounting system according to claim 1, wherein the forward engine mount is fastened to the frontal wall of the attachment pylon such that the longitudinal axis of the forward engine mount intersects with the center of thrust of the high-bypass fan, wherein the at least two thrust links are symmetrically disposed on either side of the median plane and fastened to the underside wall of the attachment pylon such that the longitudinal axis of the intermediate engine mount intersects with the longitudinal axis of the forward engine mount at the center of thrust of the high-bypass fan, and wherein the rear engine mount is fastened to the underside wall of the attachment pylon aft of the at least two thrust links.

12. An aircraft comprising:
   a fuselage;
   a wing attached to the fuselage; and
   the propulsion assembly according to claim 11 attached to an underside of the wing via the rigid structure.

9

13. An aircraft comprising:

a fuselage;

a wing attached to the fuselage;

a pylon having a rigid structure attached to an underside of the wing; and a propulsion assembly attached to the rigid structure, the propulsion assembly comprising:

an engine having a propeller with a center of thrust, a fan casing, and a core casing aft of the fan casing;

a forward engine mount coupled to the rigid structure and the engine, the forward engine mount having a longitudinal axis that intersects with the center of thrust of the engine, the forward engine mount further including at least two two-point shackles coupled to a frontal wall of the rigid structure;

an intermediate engine mount including at least two thrust links coupled to the rigid structure aft of the forward engine mount and coupled to the engine aft of the forward engine mount at a rear portion of the fan casing, the intermediate engine mount having a longitudinal axis that intersects with the center of thrust, wherein the longitudinal axis of the forward engine mount and the longitudinal axis of the intermediate engine mount intersect at the center of thrust; and a rear engine mount coupled to the rigid structure and the engine aft of the intermediate engine mount;

wherein the forward engine mount, the intermediate engine mount, and the rear engine mount are separated from each other by at least a portion of the rigid structure in a longitudinal direction of the rigid structure;

wherein an orientation of the at least two two-point shackles of the forward engine mount in relation to the rigid structure and the engine is selected from a list consisting of:

a first orientation where the at least two two-point shackles of the forward engine mount are arranged to direct a load distribution through a center point of the rigid structure;

a second orientation where the at least two two-point shackles of the forward engine mount are arranged to direct the load distribution through an upper-most point of the engine;

a third orientation where the at least two two-point shackles of the forward engine mount are arranged to direct the load distribution through an intermediate point of the engine in between an upper-most point of the engine and a centerline of the engine; or a fourth orientation where the at least two two-point shackles of the forward engine mount are arranged to direct the load distribution through the centerline of the engine;

wherein the at least two thrust links of the intermediate engine mount are coupled to the rigid structure via an intermediate fastener, the intermediate fastener coupled to the underside wall of the rigid structure;

wherein the rear engine mount includes a two-point shackle and a three-point shackle oriented on opposite sides of the centerline of the engine and coupled to the underside wall of the rigid structure aft of the intermediate engine mount; and wherein the engine mounting system is configured to provide a six degrees-of-freedom pylon interface, two degrees-of-freedom attributable to the forward engine mount in Y-Z directions, one degree-of-freedom attributable to the at least two thrust links in an X direction, and three degrees-of-freedom attributable to the rear engine mount in Mx-My-Mz directions.

* * * * *